3,117,872
CHEWING GUM AND PROCESS OF MAKING
THE SAME
Frederick Sullivan, North Wilmington, and Robert F.
Larsen, Weston, Mass., assignors to Arthur D. Little
Inc., Cambridge, Mass., a corporation of Massachusetts
No Drawing. Filed Dec. 29, 1960, Ser. No. 79,162
7 Claims. (Cl. 99—135)

This invention relates to a new composition of matter and more particularly to an improved product marketed as chewing gum.

Chewing gums are, of course, widely known and used and it is the purpose of the gum to release a desirable flavor within the mouth while it is being chewed. In the chewing of the gum, flavor is derived from essential oils or other flavoring materials, including sugar, which are incorporated in the gum.

Chewing gum is made up of two components, namely the hydrophobic and insoluble gum base which furnishes the required elastomeric repository for the flavorings extracted in chewing and the soluble flavorings incorporated in the gum base. It has been found in analyzing chewing gum after it has been chewed for prolonged periods that a large percentage of the originally added essential oils (i.e., the nonsweetening portion of the flavoring) are retained in the gum base and are therefore not available for flavoring the gum to give it a prolonged chewing time, that is, the time over which the flavor is available. To attempt to overcome this drawback through the incorporation of additional amounts of flavoring material gives the chewing gum an excessively strong flavor when first placed in the mouth. It would, therefore, be desirable to be able to incorporate into the chewing gum a material which would gradually release more of the flavor from the base thereby prolonging the time over which the gum might be enjoyed.

One of the other drawbacks to the present chewing gum formulations is the fact that after the gum has been stored over a period of time it loses freshness and becomes hard and brittle, thus making it undesirable when first introduced into the mouth. It would therefore be desirable to be able to incorporate into chewing gum formulations an additive which would permit the chewing gum to retain its flexibility over prolonged periods of storage.

We have found that a superior chewing gum can be made by incorporating as an additive in the chewing gum mixture, and preferably in the gum base, from about 0.1 to 2% by weight of the gum base of a substantially or essentially water-insoluble but water-swellable polymeric material which is capable of locking in the essential oils for continuous and prolonged release during chewing. The substantially water-insoluble polymeric material used also helps the chewing gum to retain its flexibility during storage.

It is therefore the primary object of this invention to provide an improved chewing gum formulation which will permit the flavor of the chewing gum to be released continually over a longer period of time than now possible with present formulations. It is another object of this invention to provide a chewing gum which will remain flexible and fresh over prolonged periods of time. It is another object to provide a chewing gum of the character described which contains a small amount of a substantially water-insoluble edible polymer used to bind and release the flavoring in the gum. These and other objects will become apparent in the following description.

The product of this invention may be defined as a chewing gum, or chewing gum base, having incorporated therein a small amount of an additive. The additive suitable for incorporating into chewing gum is a substantially water-insoluble, water-swellable, edible, lightly cross-linked copolymer of acrylic or methacrylic acid or mixtures of such acids with a polyunsaturated compound, as hereinafter defined. The polymer may be used in its free acid form, partially neutralized or completely neutralized.

The polymeric materials of the type described are able to absorb large quantities of aqueous liquids and in doing so they swell greatly, but do not form true solutions to any appreciable extent. In free acid form they have swelling indices in distilled water ranging from about 50 to 225, while the corresponding neutralized forms have swelling indices some three to four times greater.

The incorporation of a substantially water-insoluble but water-swellable polymer appears to achieve a type of bonding of the flavoring (both essential oils and sugars) which permits a more complete and continuous release of flavor over a longer period of time than is attainable with chewing gums which do not contain this additive.

The polymeric material additive should, of course, be compatible with the gum base and it may be used in amounts equivalent to from about 0.1 to 2% by weight of the gum base which as defined above is the hydrophobic and insoluble component of the chewing gum.

The polymeric material may be added directly to the gum base which is customarily made up separately, or it may be added with the flavoring materials when they are incorporated into the premixed gum base. It is, however, preferred to add the polymeric material to the gum base inasmuch as the beneficial effects of prolonged flavor release are more pronounced.

The water-insoluble, water-swellable polymeric additives are those resulting from the copolymerization of acrylic or methacrylic acids or mixtures of the acids with a polyunsaturated compound having a plurality of terminally unsaturated polymerizable groups and which are resistant to hydrolysis. Representative polyunsaturated compounds are the vinyl, allyl nad methallyl ethers of polyhydric alcohols having at least four carbon atoms and at least three alcoholic hydroxyl groups. The compounds should have an average of more than two unsaturated groups per molecule. Compounds of this type and their methods of polymerization with acrylic or methacrylic acids or mixtures of the acids are described in detail in U.S. Patent 2,798,053. Other polyunsaturated compounds that can be employed to prepare the additives are the polymeric benzene-soluble products resulting from Na or K polymerization of conjugated dienes. These polymers have a very large proportion of 1,2 structure in the chain and consequently have a plurality of $CH_2=$ side groups which can be copolymerized with the acrylic acids. Additive polymers of this type are described in U.S. Patent 2,858,281. Other cross-linking agents that can be copolymerized with acrylic or methacrylic acid are the polyallyl or polymethallyl trimethylene trisulfones. These monomers are described in U.S. Patents 2,535,533 and 2,535,534 and additive copolymers are described in U.S. Patent 2,958,679. Still other cross-linking agents that can be employed for making the water-swellable polymers are the polyvinyl, polyallyl or polymethallyl silanes or the corresponding tin compounds. In these compounds the silicon or tin atom is connected to a carbon atom by a covalent bond. The silicon or tin compound, of course, must have at least two of the unsaturated groups mentioned above. Particularly good additive polymers can be prepared by copolymerized tetrallyl or tetravinyl silane or tin with the acrylic acids. However, satisfactory additive polymers can be produced with tin compounds having two or three of the groups, vinyl, allyl or methallyl. The remainder of the silicon or tin atom can have any nontoxic group and particularly an alkyl group. The acrylic or methacrylic acid copolymers made with the polyallyl or polyvinyl silane or tin compounds are described in U.S. patent applications, Serial No. 854,554, filed November 23, 1959, now Patent No. 2,985,631.

Water extraction of the cross-linked polymers mentioned above for a period of twenty-four hours in a Soxhlet apparatus shows that solubility is usually considerably less than 1%, and rarely reaches 2 to 5%.

The preferred additive for the practice of this invention is a copolymer of acrylic acid and allyl sucrose, the latter being present in concentrations ranging from 0.5 to 2% by copolymer weight.

The process and product of this invention will be further described in the following examples, which are meant to be illustrative and not limiting.

*Example I*

A typical gum base was made up by soaking 1300 grams of chicle in hot water to soften it and to form a gummy mass. To this hot chicle were then added 373 grams of melted paraffin, 62 grams of Tolu balsam and 31 grams of Peruvian balsam and the mixture was thoroughly blended. The resulting blend was a rubbery-like material and was used for making up chewing gums as described below.

A control chewing gum was made by blending 300 grams of the gum base with 300 grams of corn syrup, 900 grams of confectioner's sugar and 13.5 grams of methyl salicylate (oil of wintergreen) in a Baker-Perkins sigma blade mixer.

The chewing gum was then rolled out to a thickness of about ⅛ inch and cut into strips 2½ inches by 1 inch.

*Example II*

To separate 300 gram samples of the chewing gum base of Example I were added various amounts of a copolymer of acrylic acid and allyl sucrose prepared as described in Example 5 of U.S. Patent 2,798,053. In a free acid form this copolymer when made up as a water mucilage of 1% concentration gives a liquid having a Brookfield viscosity in centipoises (20 r.p.m.) of about 175–190.

The amounts of copolymer added to the gum base samples were equivalent to 0.5, 1.0, 2.0 and 2.5% by weight. These modified gum base samples were then formulated into chewing gum using the same flavoring and procedures described in Example I.

The control sample of Example I and the samples containing the water-swellable polymer of Example II were then evaluated by a panel experienced in flavor evaluations.

Each of the samples was chewed for ten minutes and it was the unanimous finding of the panel that when the copolymer was added in an amount up to about 2% by weight of the gum base definite flavor improvements were noted. The levels of sweetness and total flavor were significantly extended and the gum containing the polymeric additive was considered easier to chew due to the plasticizing effect which the additive had. There was also indication that some of the waxy flavor associated with the paraffin wax had been covered up.

The chewing gum containing 2.5% by gum base weight of the copolymer was undesirable because it broke apart in chewing. Thus, the upper limit is about 2% in this particular base. However, in other gum bases it may be desirable to add more copolymer, e.g., 4 to 5% by weight of gum base.

Several of the sticks from each of the samples, including the control, were stored under identical conditions (72° F. and 50% RH) for six weeks. The control samples of Example I broke sharply when bent, while the samples of Example II exhibited the flexibility associated with fresh chewing gum.

The polymer additives may be used in their neutralized form provided of course the additive is edible in that form. Neutralization, or partial neutralization, is accomplished by adding a strong base (for example, sodium hydroxide) or a weak base (for example, ammonia) to the free acid form. The swelling index of the neutralized form is much greater than that of the free acid form. In order to control the flavor retention and release properties of the chewing gum, a combination of the acid and neutralized forms of the polymer may also be used.

It will, of course, be appreciated that both the gum base and flavorings used in the examples are only illustrative of typical chewing gum formulations and that these may be varied in type as well as quantity in accordance with known practices in compounding chewing gums. For example, part, or even all of the chicle, may be substituted with other elastomeric materials such as GRS rubbers and polyvinyl acetate. Likewise other forms of sugar and other essential oils or fruit flavorings may be used in place of the methyl salicylate.

Many modifications in the chewing gum of this invention are possible without departing from the scope of the invention described herein. The amount and choice of additive will be chosen to impart the desired characteristics of prolonged flavor release and retention of freshness to any one gum formulation.

We claim:

1. A chewing gum characterized as containing incorporated therein from 0.1 to about 5% by weight of an edible, substantially water-insoluble, water-swellable lightly cross-linked interpolymer of an unsubstituted alpha-beta monoolefinically terminally unsaturated monocarboxylic acid having from 3 to 4 carbon atoms and a polyunsaturated compound having at least two alkenyl groups and copolymerizable with said acid.

2. Chewing gum in accordance with claim 1 wherein said polymer is a copolymer of acrylic acid and polyallyl sucrose, said polyallyl sucrose being present in a weight range of from 0.5 to 2% by polymer weight.

3. A chewing gum characterized as containing incorporated therein from about 0.1 to about 2% by weight of the insoluble gum base of a substantially water-insoluble, water-swellable, edible interpolymer of an unsubstituted alpha-beta monoolefinically terminally unsaturated monocarboxylic acid having from 3 to 4 carbon atoms and a polyunsaturated compound having at least two alkenyl groups.

4. A chewing gum base comprising a hydrophobic elastomeric substance having incorporated therein from 0.1 to about 5% by weight of an edible, substantially water-insoluble, water-swellable lightly cross-linked interpolymer of an unsubstituted alpha-beta monoolefinically terminally unsaturated monocarboxylic acid having from 3 to 4 carbon atoms and a polyunsaturated compound having at least two alkenyl groups and copolymerizable with said acid.

5. Gum base in accordance with claim 4 wherein said polymer is a copolymer of acrylic acid and polyallyl sucrose, said polyallyl sucrose being present in a weight range of from 0.5 to 2% by polymer weight.

6. Gum base in accordance with claim 4 wherein said polymer is at least partially neutralized.

7. Process of making chewing gum characterized by incorporating into said gum from 0.1 to about 5% by weight of an edible, substantially water-insoluble, water-swellable lightly cross-linked interpolymer of an unsubstituted alpha-beta monoolefinically terminally unsaturated monocarboxylic acid having from 3 to 4 carbon atoms and a polyunsaturated compound having at least two alkenyl groups and copolymerizable with said acid.

References Cited in the file of this patent

UNITED STATES PATENTS

| 2,740,772 | Alfrey | Apr. 3, 1956 |
| 2,798,053 | Brown | July 2, 1957 |